US006407720B1

(12) United States Patent
Josypenko

(10) Patent No.: US 6,407,720 B1
(45) Date of Patent: Jun. 18, 2002

(54) CAPACITIVELY LOADED QUADRIFILAR HELIX ANTENNA

(75) Inventor: Michael J. Josypenko, Norwich, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/602,517

(22) Filed: Jun. 23, 2000

(51) Int. Cl.[7] .............................. H01Q 1/36; H01G 4/38
(52) U.S. Cl. ........................................ 343/895; 361/328
(58) Field of Search ................................. 343/895, 749, 343/850, 890, 891, 742, 893; 361/326, 328; D13/125; 455/82; H01Q 1/36

(56) References Cited

U.S. PATENT DOCUMENTS

| | | | | |
|---|---|---|---|---|
| 4,554,554 A | * 11/1985 | Olesen et al. | ............... | 343/895 |
| 5,701,130 A | * 12/1997 | Thill et al. | .................. | 343/895 |
| 5,721,557 A | * 2/1998 | Wheeler et al. | ............ | 343/895 |
| 5,742,470 A | * 4/1998 | Raets | ...................... | 361/301.5 |
| 5,854,608 A | * 12/1998 | Leisten | ....................... | 343/895 |
| 6,137,996 A | * 10/2000 | Baumann | ..................... | 455/82 |
| 6,246,379 B1 | * 6/2001 | Josypenko | .................. | 343/895 |
| 6,256,850 B1 | * 7/2001 | Lauffer et al. | ............. | 29/25.42 |

* cited by examiner

*Primary Examiner*—Don Wong
*Assistant Examiner*—Trinh Vo Dinh
(74) *Attorney, Agent, or Firm*—Michael J. McGowan; Prithvi C. Lall; Michael F. Oglo

(57) ABSTRACT

A quadrifilar helix antenna is provided having a feedpoint for the antenna connecting to individual helical antenna elements. Each antenna element comprises a normal helix element with a plurality of series capacitors inserted along the element length with a maximum capacitor value at a feed end and a minimum capacitor value at a remote or unfed end.

Again, the element is not simply a series of connected capacitors-if it were it would not radiate. The element is a normal element, which is inductive, which has had capacitors inserted along its length.

13 Claims, 9 Drawing Sheets

CAPACITIVELY LOADED QUADRIFILAR HELIX ANTENNA

CROSS-REFERENCE TO RELATED APPLICATIONS

This patent application is related to a U.S. Pat. Ser. No. 09/356,808, now U.S. Pat. No. 6,246,379, entitled Helix Antenna, filed Jul. 19, 1999 by the inventor hereof and assigned to the assignee hereof is incorporated herein by reference.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to antennas and more specifically to quadrifilar antennas.

(2) Description of the Prior Art

Numerous communication networks utilize omnidirectional antenna systems to establish communications between various stations in the network. In some networks one or more stations may be mobile while others may be fixed land-based or satellite stations. Hemispherical antenna systems, i.e., antenna systems omni-directional above the azimuth and having good front-to-back ratio in elevation direction, are preferred in such applications because alternative highly directional antenna systems become difficult to apply, particularly at a mobile station that may communicate with both fixed land-based and satellite stations. In such applications it is desirable to provide an omnidirectional (in the azimuth plane) antenna system that is compact yet characterized by a wide bandwidth and a good front-to-back ratio with either horizontal or vertical polarization (in the elevation plane).

Some prior art hemispherical antenna systems use an end fed quadrifilar helix antenna for satellite communication- and a co-mounted dipole antenna for land based communications. However, each antenna has a limited bandwidth. Collectively their performances can be dependent upon antenna position relative to a ground plane. The dipole antenna has no front-to-back ratio and thus its performance can be severely degraded by heavy reflections when the antenna is mounted on a ship, particularly over low elevation angles. These co-mounted antennas also have spatial requirements that can limit their use in confined areas aboard ships or similar mobile stations. The following patents disclose helical antennas that exhibit some, but not all, of the previously described desirable characteristics.

For example, U.S. Pat. No. 5,329,287 (1994) to Strickland discloses a device for use in a helical antenna having an antenna element wound about the periphery of a dielectric support post, the post being in the form of a tube or cylinder. The device has an electrically conductive member electrically connected to one end of said antenna element. The conductive member is of any appropriate shape or configuration and is operable to increase the loading on the antenna whereby standing waves on the antenna element are reduced and a more uniform electrical current is produced along the antenna element.

U.S. Pat. Nos. 5,485,170 (1996) and 5,604,972 (1997) to McCarrick disclose a mobile satellite communications system (SMAT) mast antenna with reduced frequency scanning for mobile use in accessing stationary geosynchronous and/or geostable satellites. The antenna includes a multi-turn quadrifilar helix antenna that is fed in phase rotation at its base and is provided with a pitch and/or diameter adjustment for the helix elements, causing beam scanning in the elevation plane while remaining relatively omni-directional in azimuth. The antenna diameter and helical pitch are optimized to reduce the frequency scanning effect, and a technique is disclosed for aiming the antenna to compensate for any remaining frequency scanning effect.

U.S. Pat. No. 5,701,130 (1997) to Thill et al. discloses a self phased antenna element with a dielectric. The antenna element has two pairs of arms in a crossed relationship to transceive a signal at a resonant frequency. A dielectric is disposed adjacent an arm to obtain a self phased relationship in the arms at the resonant frequency. The arms can form crossed loops or twisted crossed loops such as a quadrifilar helix antenna element. A dielectric collar on arms of the same loop causes currents to be equally spaced from one another. The antenna size is reduced and a cross section of the antenna element appears circular without degradation of a gain pattern when the dielectric is used on a certain arm.

In U.S. Pat. No. 5,721,557 (1998) Wheeler et al. disclose a nonsquinting end-fed quadrifilar helix antenna. In essence this patent uses a limited series capacitive loading along the antenna element length. The disclosed antenna is 4 wavelengths long and is an array. Each conductor of the antenna is fed with a successively delayed phase representation of the input signal to optimize transmission characteristics. Each of the conductors is separated into a number, Z, of discrete conductor portions by Z-1 capacitive discontinuities. The addition of the capacitive discontinuities results in the formation of the antenna array. The end result of the antenna array is a quadrifilar helix antenna which is nonsquinting, that is, the antenna radiates in a given direction independently of frequency.

Quadrifilar helix antennas having a diameter of between 0.1 and 0.25 wavelengths are good candidates for satellite communications since they have overhead cardoid shaped patterns of circularly polarized signals and reasonable front-to-back ratios. However, these antennas do have pattern limitations. For a practical, useful impedance bandwidth, each antenna element must be at least three-quarters wavelength long. For example, an antenna with elements of that length and a diameter of 0.125 wavelengths can be constructed with a pitch angle of 65°. For a higher pitch angle helix, i.e., greater than 50°, impedance bandwidth increases with element length, but much more slowly than, for example, a 40° helix which cuts in sharply near $3/4\lambda$ and then is well matched forever. If the 65° helix is to be well matched, e.g., near $3/4\lambda$ its impedance bandwidth, when translated to a characteristic impedance, e.g., a feed $Z_0$ of 50 ohms, is about 12%. If the effective length of the antenna is greater than three-quarters of a wavelength, the patterns start to multilobe and split above the horizon with the severity of the splitting in terms of the depth of the pattern nulls being determined by antenna element pitch angle. The observed nulls are less deep for sharper beam, lower pitch angle, helices. However, for any quadrifilar helix, the pattern does tend to flatten toward the horizon as frequency increases.

Stated differently, for all quadrifilar helix antennas, increasing the pitch angle broadens the pattern toward the horizon; lower pitch angles produce sharper overhead patterns. Normally the broader patterns near the horizon are desired for satellite communication so some flattening of overhead gain is permissible since the distance to the satellite is generally less overhead than near the horizon. While the impedance bandwidth can be increased by allowing the antenna elements to become longer as measured by wavelengths, this will also produce a multilobing problem above the three-quarter wavelength distance.

As described in the prior art, there exists a family of quadrifilar helices that are broadband impedance wise above a certain "cut-in" frequency, and thus are useful for wideband satellite communications including Demand Assigned Multiple Access (DAMA) UHF functions in the range of 240 to 320 MHz and for other satellite communications functions in the range of 320 to 410 MHz. Typically these antennas have (1) a pitch angle of the elements on the helix cylindrical surface from 50 down to roughly 20 degrees, (2) elements that are at least roughly ¾ wavelengths long, and (3) a "cut-in" frequency roughly corresponding to a frequency at which a wavelength is twice the length of one turn of the antenna element. This dependence changes with pitch angle. Above the "cut-in" frequency, the helix has an approximately flat VSWR around 2:1 or less (about the $Z_0$ value of the antenna). Thus the antenna is broadband impedance-wise above the cut-in frequency. The previous three dimensions translate into a helix diameter of 0.1 to 0.2 wavelengths at the cut-in frequency.

For pitch angles of approximately 30° to 50°, such antennas provide good cardoid shaped patterns for satellite communications. Good circular polarization exists down to the horizon since the antenna is greater than 1.5 wavelengths long (2 elements constitute one array of the dual array, quadrifilar antenna) and is at least one turn. At the cut-in frequency, lower angled helices have sharper patterns. As frequency increases, patterns start to flatten overhead and spread out near the horizon and small nulls start to form overhead. For a given satellite band to be covered, a tradeoff can be chosen on how sharp the pattern is allowed to be at the bottom of the band and how much it can be spread out by the time the top of the band is reached. This tradeoff is made by choosing where the band should start relative to the cut-in frequency and the pitch angle.

For optimum front-to-back ratio performance, the bottom of the band should start at the cut-in frequency. This is because, for a given element thickness, backside radiation increases with frequency (the front-to-back ratio decreases with frequency). This decrease of front-to-back ratio with frequency limits the antenna immunity to multipath nulling effects.

Other factors that influence the front-to-back ratio include the method of feeding the antenna, the physical size of antenna elements, the dielectric loading of the antenna elements and the termination of the antenna elements. Looking first at antenna feeding, the front-to-back ratio improves when an antenna is fed in a "backfire mode" such that the antenna feed point is at the top of a vertically oriented antenna, as opposed to a "forward fire mode" when the feed point is at the bottom of the antenna.

Thinner elements increase the front-to-back ratio somewhat. However, as the elements become thinner, the antenna characteristic impedance $Z_0$, and thus input impedance to the antenna increases and introduces a requirement for impedance matching. Alternatively, lower impedances can be obtained by constructing an antenna with a partial overlap of the antenna elements to increase capacitance. However, a loss of impedance bandwidth starts to occur since such capacitance is non-radiating; that is, no radiation can occur from the overlapped areas of the antenna.

Increasing the dielectric loading of the helix elements decreases the front-to-back ratio. Wide flat elements found in many helix antennas have a pronounced loading since one side of each antenna element touches the dielectric. If the gap between adjacent elements is small, the field is strongly concentrated in the gap and any dielectric in the gap will load the antenna strongly. Quadrifilar helix antennas can terminate with open or shorted ends remote from the feed point. It has been found that antennas with open ends have a slightly higher front-to-back ratio than do antennas with shorted ends.

My above-identified pending U.S. Pat. Ser. No. 09/356,808 now U.S. Pat. No. 6,246,379 issued Jun. 12, 2001, discloses an antenna having four constant-width antenna elements wrapped about the periphery of a cylindrical support. This construction provides a broadband antenna with a bandwidth of 240 to at least 400 MHz and with an input impedance of 100 ohms, which matches the impedance of the antenna's feed network. This antenna also exhibits a good front-to-back ratio in both open-ended and shorted configurations. In this antenna, each antenna element has a width corresponding to about 95% of the available width for that element. However, it was found that this antenna requires a tradeoff between the pattern shapes in the transmit and receive bands. It became necessary to allow patterns at lower receive frequencies to become sharper overhead than desired. At higher transmit frequencies, it became necessary to accept overhead patterns that were flatter overhead than desired. At even higher frequencies, small to moderate nulls were observed in the patterns because the element lengths were becoming long enough electrically for multilobing to begin.

Thus, there is a need for a quadrifilar helix antenna that will produce a more constant pattern shape over a range of frequencies. In particular, there is a need for an antenna that produces a stable pattern over an extended frequency band with a good impedance match over that band.

SUMMARY OF THE INVENTION

Therefore it is an object of this invention to provide a broadband unidirectional hemispherical coverage radio frequency antenna.

Another object of this invention is to provide a broadband unidirectional hemispherical coverage antenna with good front-to-back ratio over a range of frequencies.

Still another object of this invention is to provide a broadband unidirectional hemispherical coverage antenna that operates with a circular polarization and that exhibits a good front-to-back ratio.

Still another object of this invention is to provide a broadband unidirectional hemispherical coverage antenna that provides an essentially constant radiation pattern over a range of frequencies.

Yet another object of this invention is to provide a broadband unidirectional hemispherical coverage antenna in the form of a quadrifilar helix antenna that operates over a wide frequency band with essentially constant impedance and an essentially constant pattern shape.

In accordance with one aspect of this invention, a quadrifilar helix antenna comprises a cylindrical support extending along an antenna axis. A plurality of antenna elements are wrapped helically about the cylindrical support and along the antenna axis. Each of the antenna elements includes a plurality of series connected capacitors.

In accordance with another aspect of this invention, a quadrifilar helix antenna includes a cylindrical support extending along an antenna axis and a plurality of dielectric strips wrapped helically about the cylindrical support from a feed end to a remote end. A plurality of conductive elements are spaced along the opposite sides of the dielectric strip. Each conductive element on one side is offset with respect to a corresponding conductive element on the other side thereby to partially overlap with respect to at least one of the conductive elements on the other side. An overlapped area of a pair of spaced conductors constitutes a capacitor. This defines an antenna element formed as a plurality of series connected capacitors.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
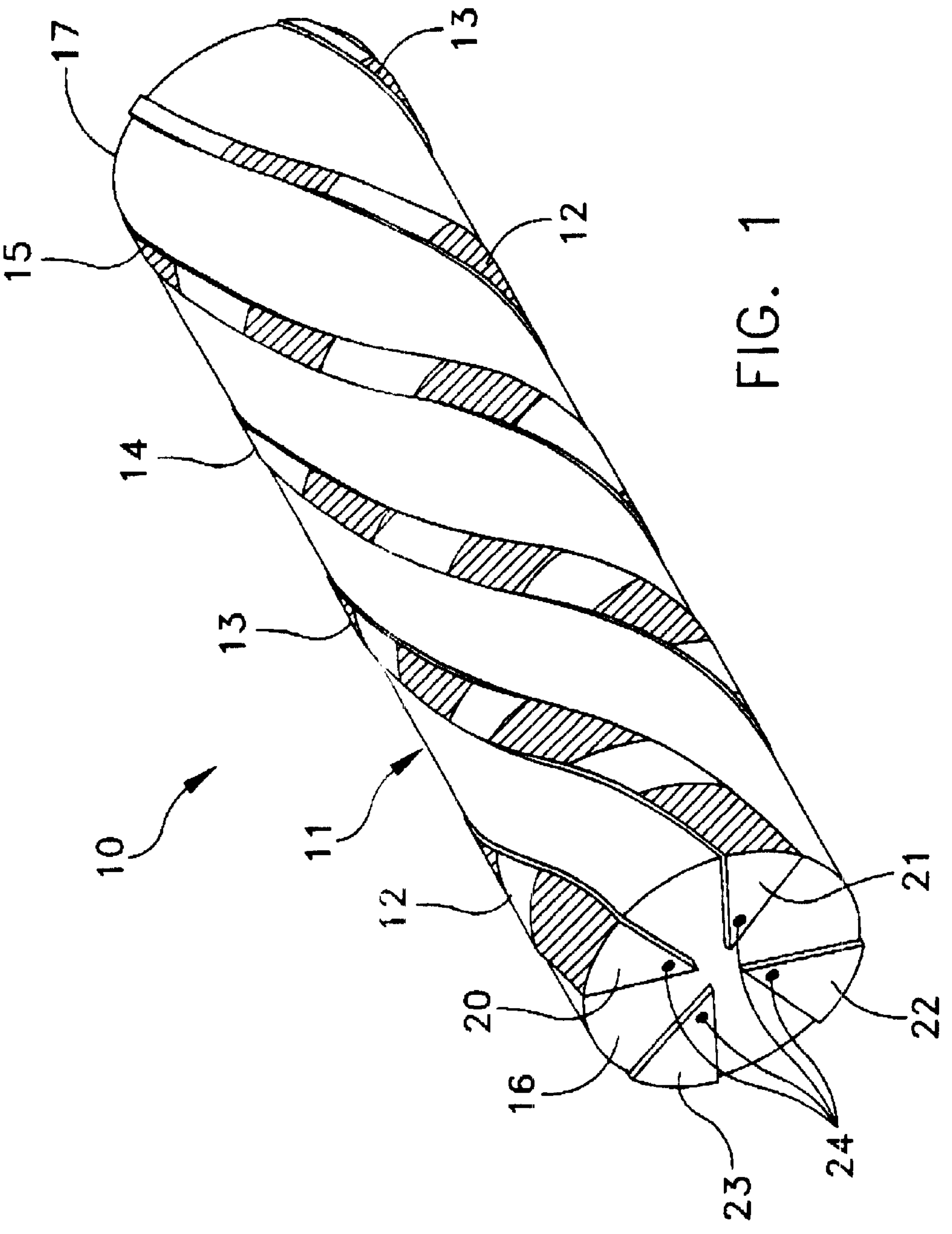
FIG. 1 is a perspective view of one embodiment of a quadrifilar helix antenna constructed in accordance with this invention.

In FIG. 1, a quadrifilar helix antenna 10 constructed in accordance with this invention includes a cylindrical insulated core 11. Four antenna elements 12, 13, 14 and 15 wrap helically about the core 11 and extend from a feed or first end portion 16 to a remote, unfed or second end portion 17. The antenna element 12 and identical antenna elements 13,14 and 15 are wrapped as spaced helices about the core 11.

Still referring to FIG. 1, a plurality of conductive paths 20 through 23 extend from central feedpoints 24, supported on the end portion 16, to each of the helically wrapped elements 12 through 15, respectively. The signals applied to these feedpoints are in phase quadrature. In one form, an RF signal at an rf frequency is applied to a 90° power splitter with a dump port terminated in a characteristic impedance, $Z_0$. The two outputs of the 90° power splitter connect to the inputs of two 180° degree power splitters thereby to provide the quadrature phase relationship among the signals on adjacent ones of the antenna elements 12 through 15. It is known that swapping the output cables of the 90° power splitter will cause the antenna to transfer between backfire and forward fire radiation modes.

In order to understand the operation of this invention it will be helpful to understand the operation of a cylindrical monopole formed by distributing exponentially a capacitive load along the length of the monopole. Such an antenna is described in "Broadband Characteristics of Cylindrical Antenna with. Exponentially Tapered Capacitive Loading" IEEE Antennas and Propagation, March, 1969. In that monopole antenna 39 cylindrical disk capacitors are inserted into and distributed evenly along the monopole with capacitive impedance loading increasing toward the unfed end of the monopole. The purpose of increased loading is to taper the current along the length of the monopole, so to effectively keep the radiation length of the monopole below a multilobing length of three-quarter wavelengths, and avoid cycle phase changes along the element length. The thicknesses of the dielectrical disks of the capacitors are given as:

$$t_n = A(e^{an} - 1) \tag{1}$$

where $t_n$ is the capacitor dielectric thickness, n is the capacitor number ranging from n=1 for the capacitor closest to the feed end of the monopole to n=39 for the capacitor closest to the unfed end of the monopole. In this paper A is a constant of 12.5 and α is a rate of exponentiation and was established at 0.8. Each capacitor had a radius $r_c$, equal to the monopole radius which was 0.5". The monopole had a height h which for a 600 MHz antenna was 10" for one-half wave.

Such a monopole construction is not readily adapted to a quadrifilar helix antenna. However, the antenna constructed in accordance with this invention equates, with frequency scaling, the cylindrical shaped capacitance of the monopole to square shaped capacitors used on a helix. In addition the number of capacitors are changed.

Thus, the equation for the area of a square capacitor as a function of the area of a cylindrical capacitor becomes:

$$A_{sc} = \frac{A_{cc} t_{sh}}{t_n} F^2 \frac{n_c}{39} \tag{2}$$

where $A_{sc}$ represents the area of a square capacitor. $A_{cc}$ is the area of a capacitor having a radius of $r_c$, $t_{sh}$ is the thickness of the square capacitor, $t_n$ is derived from Equation (1), F is a size scaling factor that was selected to be 5 and $n_c$ represents the number of capacitors on the helix (39 being the number of capacitors on the original monopole). The size scaling factor of 5 was chosen to reduce the cut-in frequency of the monopole antenna (600 MHz) to 120 MHz for the quadrifilar helix at SATCOM frequencies, far below a desired cut-in frequency of 240 MHz. This is because in a bifilar helical antenna, when the two antenna elements are folded from a dipole into a bifilar helix, much low frequency impedance match is loss. In addition, the number of capacitors was reduced to 19 resulting in 20 element segments using an antenna modeling rule which states that an antenna element can be modeled with segments of maximum length of approximately one-eight wavelength with no change in antenna performance. With a chosen element length of 50 inches over 20 segments, the length of a segment is one-eighth wavelength at 590.6 MHz, which is beyond the intended frequency use of antennas constructed in accordance with this invention.

With a quadrifilar antenna having an element length starting near three-quarters of a wavelength and a pitch angle of 66°, the antenna was found to start at the bottom of the band with rather broad patterns well suited for satellite communications. However, the pattern started to flatten out and null or form multiple lobes overhead at about 300 MHz.

Figure 2:
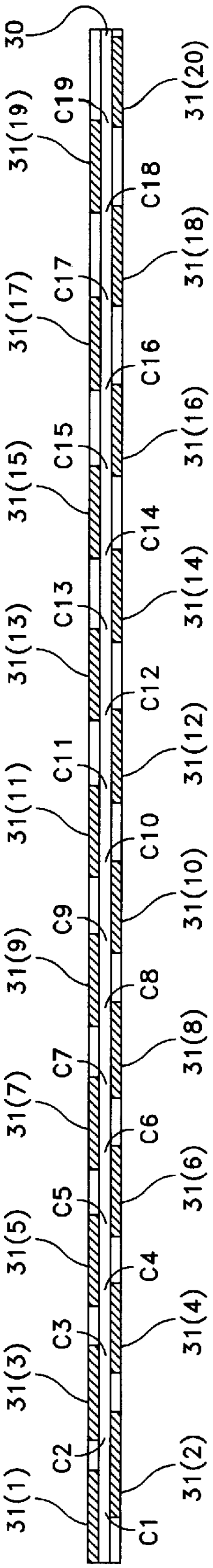
FIG. 2 is a side schematic view. of an antenna element in an unwrapped state for the antenna shown in FIG. 1.
Figure 3:
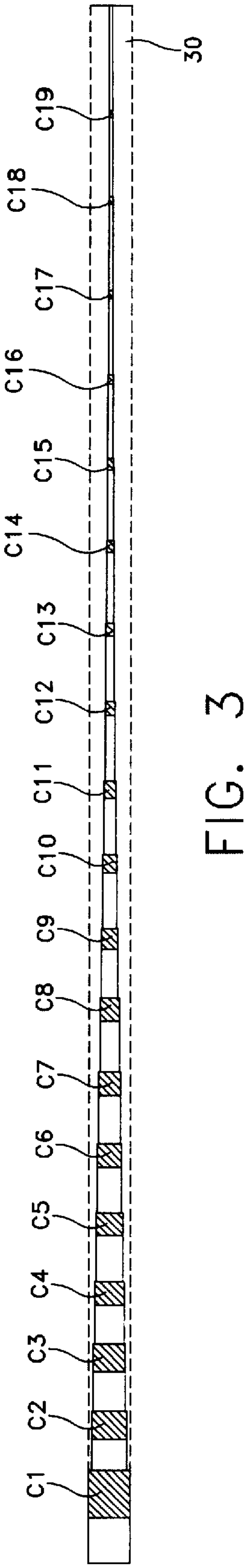
FIG. 3 is a top schematic view of the antenna element shown in FIG. 2.

Now referring to FIGS. 2 and 3, each of the antenna elements 12 through 15 in FIG. 1 has an identical structure so only antenna element 12 is depicted in detail, this element being shown in an unwound state. The antenna element comprises a constant width Mylar sheet 30 having a plurality of spaced, metal or conductive segments 31 alternately distributed on opposite sides of the Mylar tape, such that segments 31(1), 31(3) . . . 31(19) are distributed along one side of the Mylar sheet 30, the top side in FIG. 2, while segments 31(2), 31(4) . . . 31(20) are distributed along the other side of the Mylar sheet 30, in FIG. 2. The segments are of the same length with the exception of segment 31(1), which is shorter than 31(2) for reasons as will be discussed later. The widths of segments 31 become smaller starting from a maximum width at segment 31(2) to a minimum width at segment 31(20). Thus, the cross-sectional areas of each of the segments 31 change from a maximum area for segment 31(2) to a minimum segment area for segment 31 (20). The elements on one side of the sheet 30 are offset along the length of the sheet 30 with respect to the elements on the other side of the sheet 30. As a result, the intermediate elements 31(2) through 31(19) overlap portions of two adjacent elements on the opposite side of the tape. For example, element 31(5) overlaps portions of element 31(4) and 31(6). This construction then forms a capacitor at each overlapping portion. A capacitor $C_1$ is formed in the area of overlap of the elements 31(1) and 31(2); a second capacitor $C_2$, by the overlap between the elements 31(2) and 31(3). These areas of overlap are depicted by the shaded squares $C_1$ through $C_{19}$ in FIG. 3. Consequently in the antenna element 12 shown in FIGS. 2 and 3, nineteen capacitive elements are formed, shown as $C_1$ through $C_{19}$ in FIGS. 2 and 3. Moreover, the capacitors have areas that decrease corresponding to the decreasing areas of segments 31 so that the capacitor $C_1$ has a maximum value while the capacitor $C_{19}$ has a minimum value.

The overlapping areas, or capacitors, have a square configuration, thus the spacing of segments 31 is such that the centerlines of the capacitors $C_1$ through $C_{19}$ are equally spaced along sheet 30. As segments 31(1) and 31(20) each form only a single capacitor, their lengths are shorter than segments 31(2) through 31(19). Further in accordance with this invention, the antenna element 31(1) connects to the conductive path in FIG. 1 and becomes the fed end while the capacitor $C_{19}$ is located on the unfed end. As will now be apparent the capacitors $C_1$ through $C_{19}$ are connected in series so that when mounted on a core and wrapped helically, the antenna element 12 is formed as a plurality of series connected capacitors wrapped helically on the cylindrical support and along the antenna axis. Each capacitor includes a dielectric and substantially square, overlapping areas formed by metal layers on opposite sides of the dielectric, such that the areas of square overlap diminish from a maximum at the feed end of the antenna to a minimum at the remote or unfed end of the antenna.

Using just area $A_{sc}$ without a multiplier gave an impedance whose cut-in frequency was too high. Doubling the value of $A_{sc}$ reduced impedance loading on the antenna and therefore reduced cut-in frequency. The following table defines a standard helical antenna and an antenna constructed in accordance with this invention utilizing capacitive loading:

| Parameter | Standard Antenna | Capacitively Loaded Antenna |
|---|---|---|
| Mode of operation | Forward fire | Forward fire |
| Impedance at antenna end | Open | Open |
| Antenna input impedance $Z_0$ | 300 ohms | 175 ohms |
| Helix cylinder diameter | 5.5" | 5.5" |
| Cylinder length | 30" | >30" |
| Cylinder material | 1/16" thick fiberglass | 1/16" thick fiberglass |
| Helix element material (thickness) | Copper tape (0.003") | Copper tape (0.003") on Mylar sheet (0.005") |
| Helix element width | 2.44" | Varied |
| Helix element thickness | 0.003" | 0.011" |
| Helix element length | 25" | 50" |
| Pitch angle | 66.64° | 66.64° |

Although the helix element length in an antenna constructed in accordance with this invention is twice the length of a normal unloaded element, in the capacitive case the exact electrical end of the element is hard to define. At low frequencies the capacitors at the unfed ends of the elements have very high impedances and thus electrically the element is appreciably shorter.

Figure 4A:
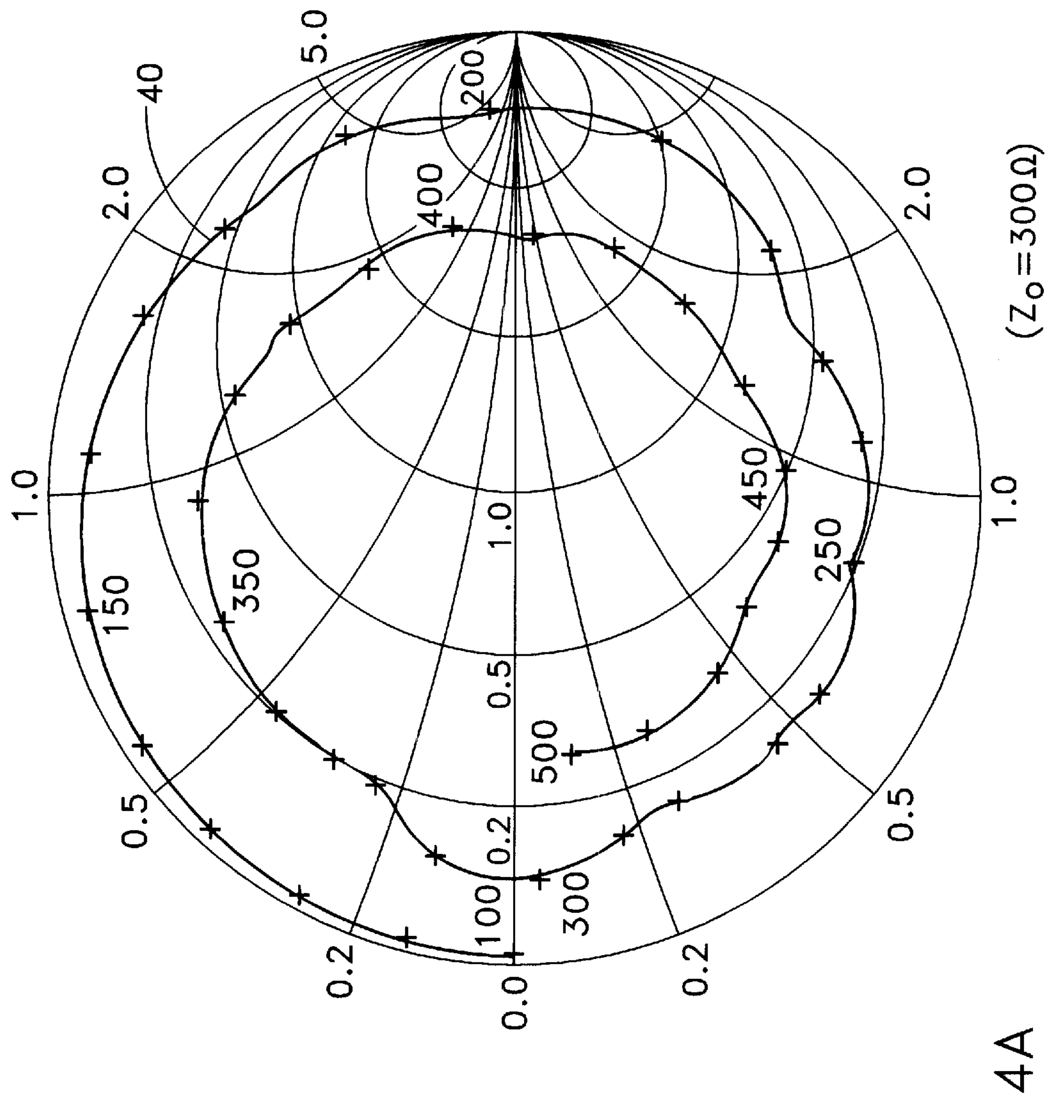
FIGS. 4A and 4B are Smith charts for depicting measured antenna impedances for a standard helical antenna and an antenna constructed in accordance with this invention, respectively.
Figure 4B:
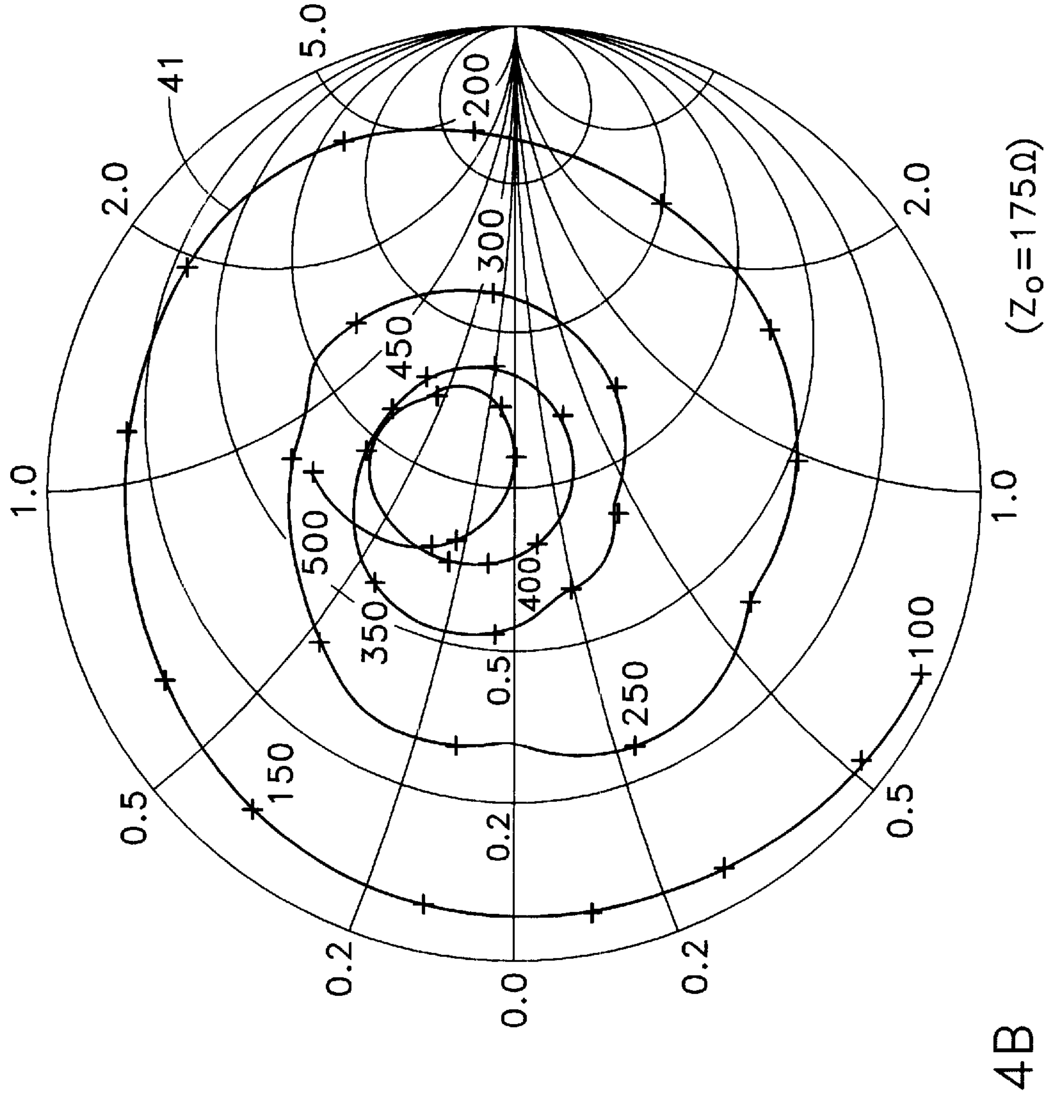

FIGS. 4A and 4B are Smith chart impedances of the standard antenna and an antenna constructed in accordance with this invention respectively. Comparing the impedance plots 40 of FIGS. 4A for the standard antenna and 41 of FIG. 4B for the antenna of this invention shows that an antenna constructed in accordance with this invention cuts in at a somewhat lower frequency and that its broadband match above the cut-in frequency is better than the standard antenna. It is hypothesized that part of the better match results because the Mylar capacitors introduce some undesirable losses into the antenna. As a qualitative test, when the antenna was energized with 100 watts of input power, capacitors near the open end of the antenna became warm and rough estimates indicate 1 dB loss due to losses in the capacitors.

Figure 5:
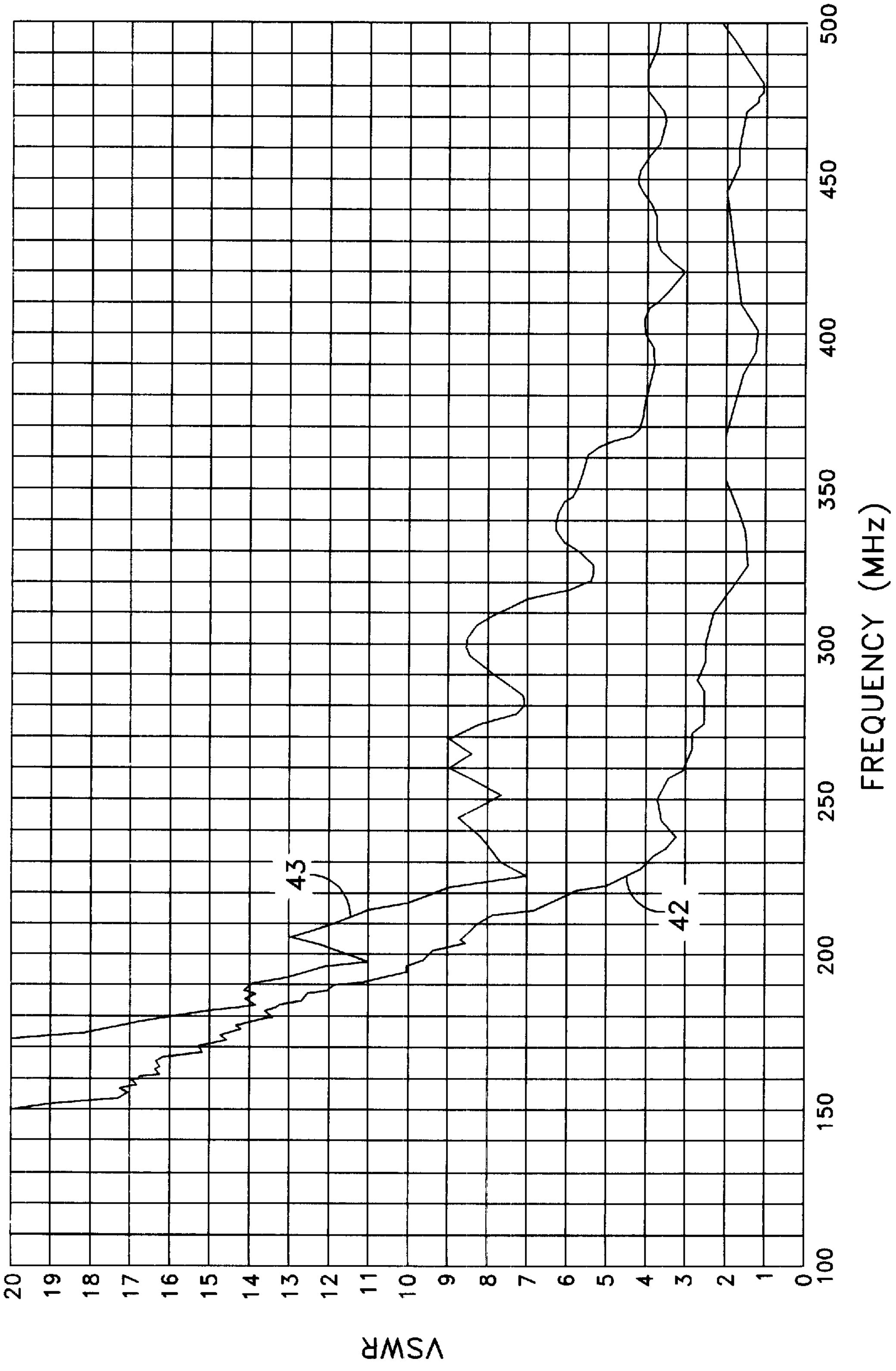
FIG. 5 compares the VSWR of a standard helical antenna and an antenna constructed in accordance with this invention about the respective characteristic impedance of each antenna.
Figure 6A:
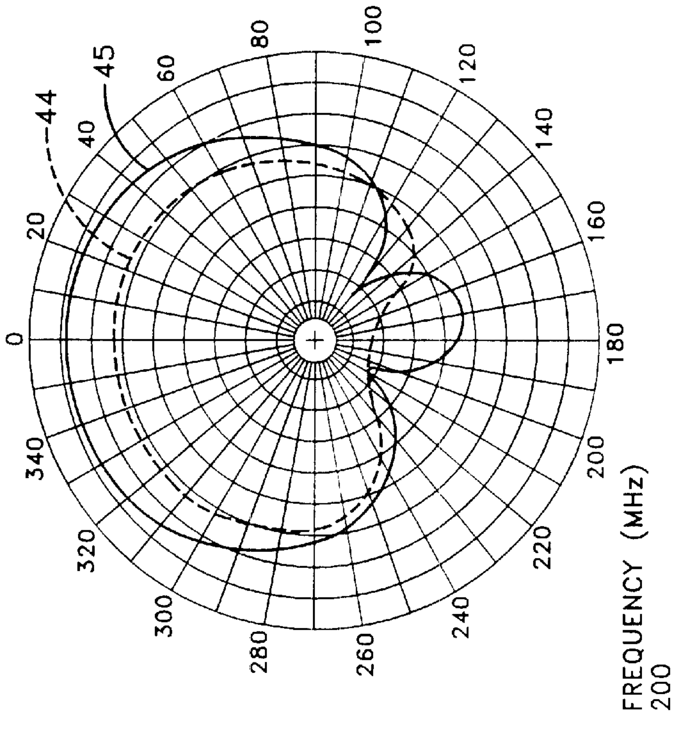
FIGS. 6A through 6H compare the antenna performance for a standard helical antenna and an antenna constructed in accordance with this invention.
Figure 6B:
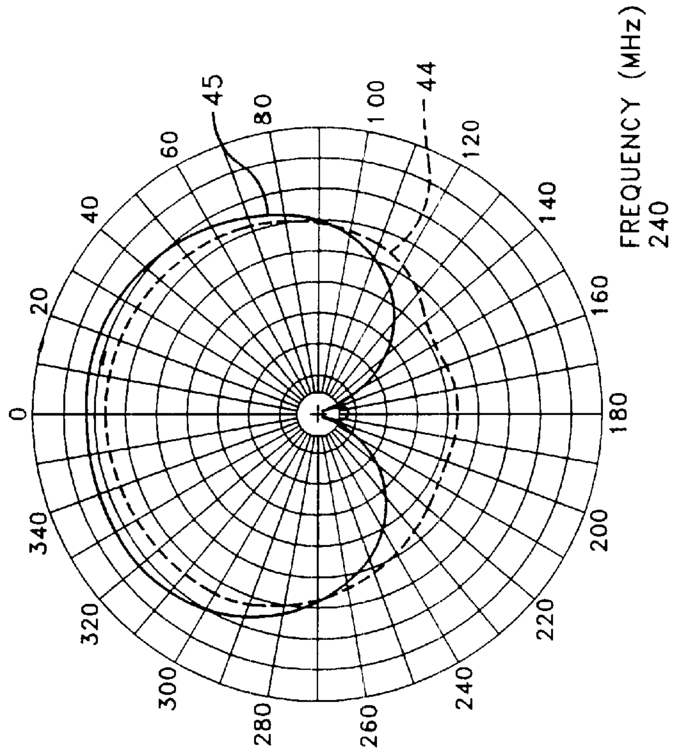
Figure 6C:
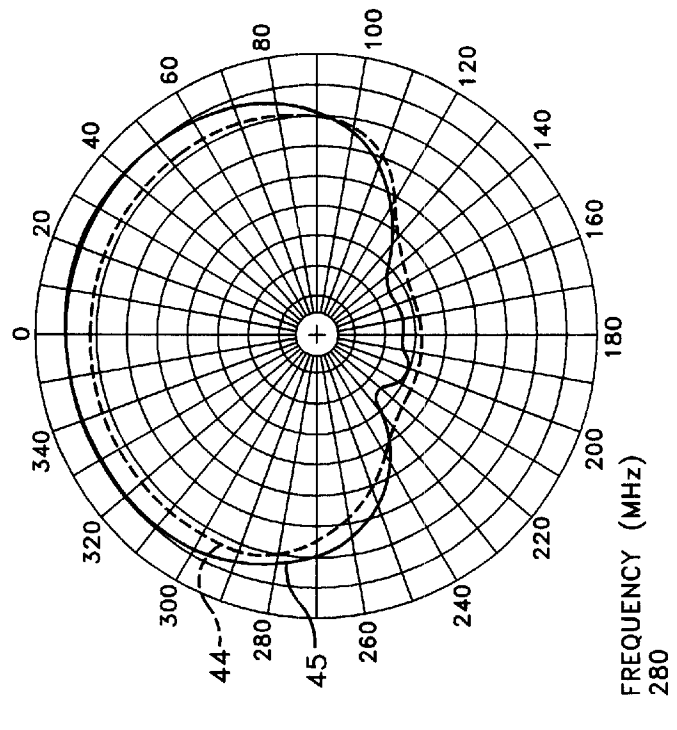
Figure 6D:
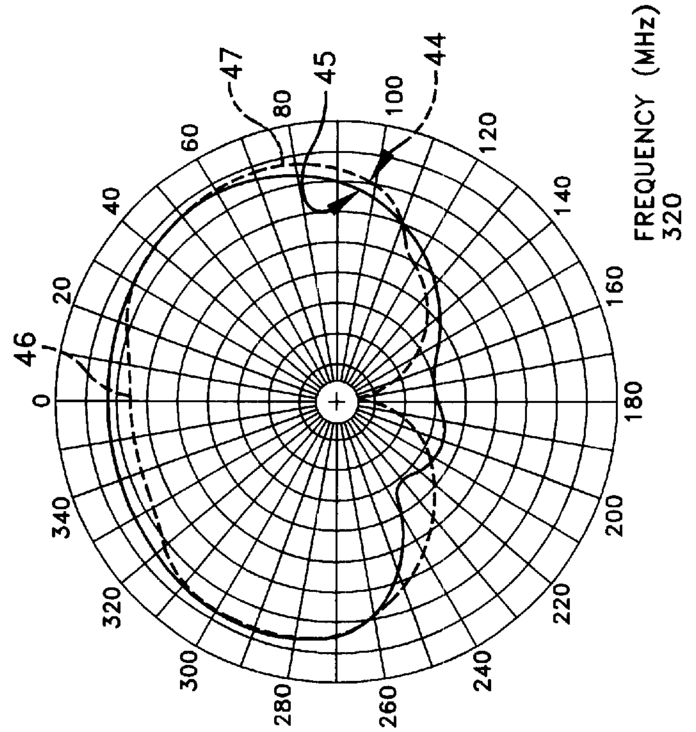
Figure 6F:
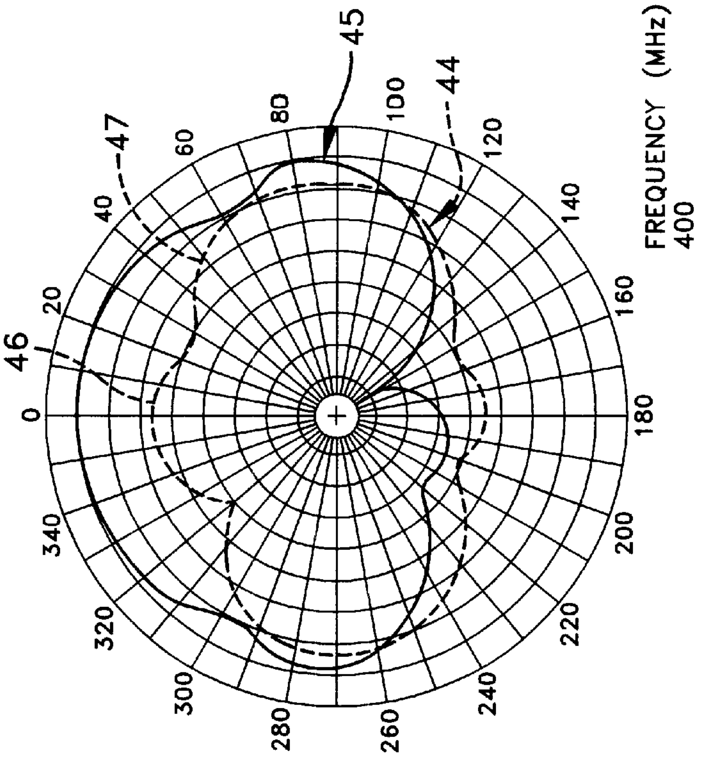
Figure 6E:
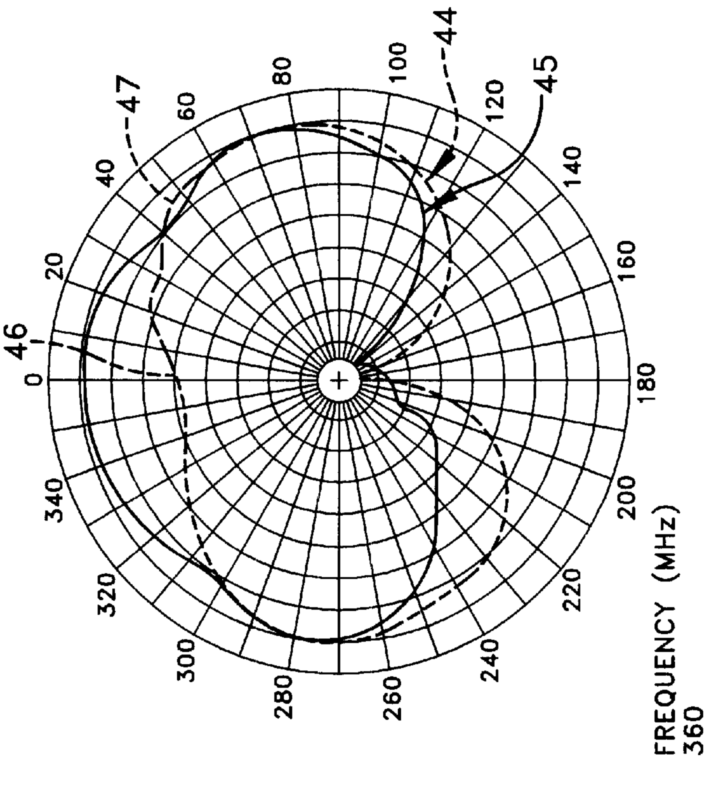
Figure 6H:
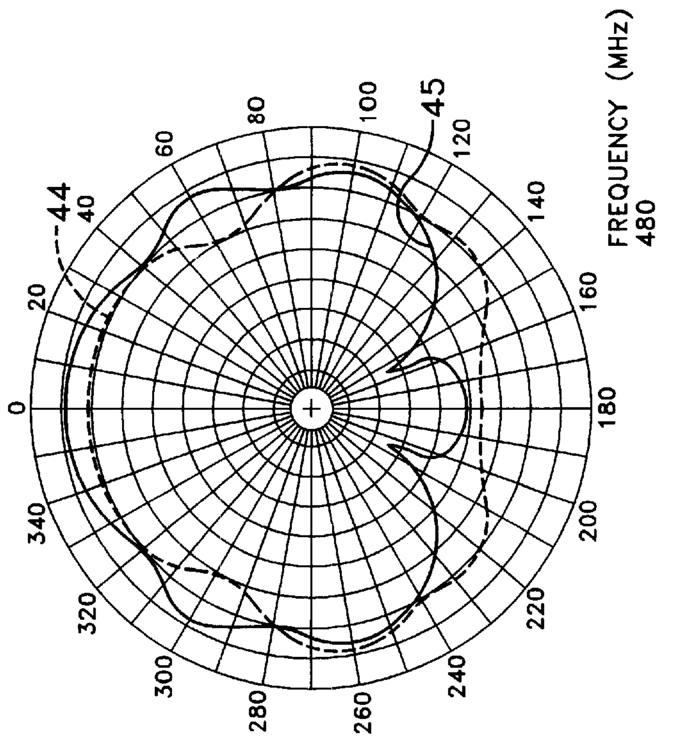
Figure 6G:
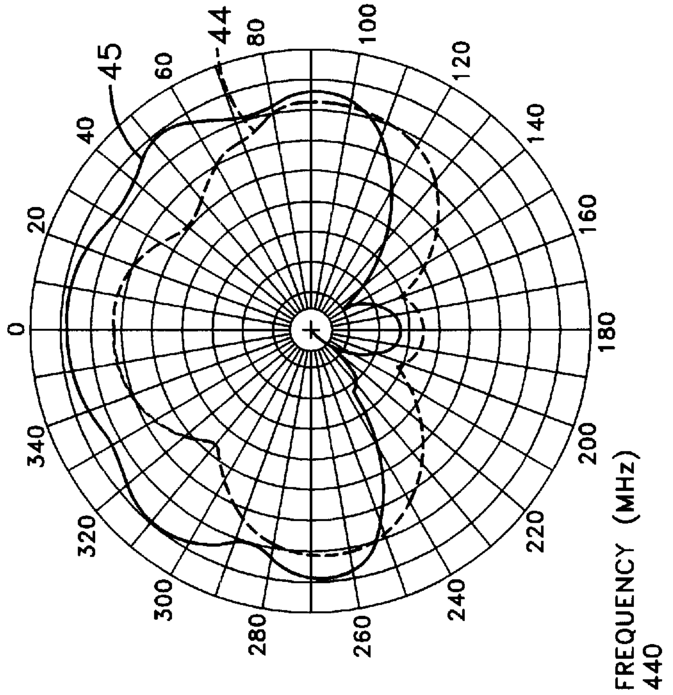

FIG. 5 depicts the VSWR about the antenna $Z_0$ as a function of frequency represented by graph 42 for an antenna constructed in accordance with this invention. Graph 43 depicts the VSWR about the antenna $Z_0$ for the above-identified standard antenna. As will be apparent the VSWR is lower at all frequencies than the standard antenna and in the normal operating range is less than one-half the VSWR encountered with the standard antenna.

FIGS. 6A through 6H provide pattern comparisons at different frequencies. In each of these figures the standard antenna is represented by Graph 44 and an antenna constructed in accordance with this invention by a Graph 45. Gain comparisons can be made if the mismatch loss between the feed $Z_0$ of 100 ohms and the antenna impedance is taken into account. In a final configuration, a matching transformer would be required to match the antenna $Z_0$ to 50 ohms (or 100 ohms if the antenna is fed with 180° power splitters). Overhead splitting 46 and lobes 47 begin to form in FIG. 6D and become more pronounced in FIGS. 6E and 6F as frequency increases. In the range from 320 MHz through 480 MHz, an antenna constructed in accordance with this invention provides more even gain in the vertical direction, although some multilobing begins to occur at about 360 MHz. However, the pattern variation and pattern bandwidth in the vertical direction is greatly improved.

Thus a quadrifilar helix constructed in accordance with this invention using antenna elements formed as a plurality of series of capacitors along the element series and connected capacitors. It is a series of element segments and capacitors produces an antenna that has an improved broadband impedance match and greatly increased cardoid shaped pattern bandwidth. While this antenna has been depicted in terms of a specific arrangement of series capacitors, including spacings and relative capacitance values, it will be apparent that a number of different variations could also be included other than the structures shown in FIGS. 2 and 3. In addition, materials used for the dielectric sheet and conductive segments may be varied. For example, the dielectric sheet may be formed of Teflon® or other similar plastic material, and the conductive segments may be formed of other low loss metals, such as aluminum, silver, or gold. Consequently, it is the intent of the appended claims to cover all such variations and modifications as come under the true spirit and scope of this invention.

What is claimed is:

1. A quadrifilar helix antenna comprising a cylindrical support extending along an antenna axis; and a plurality of antenna elements wrapped helically on said cylindrical support and along the antenna axis from a feed end to a remote end, each of said antenna elements including a plurality of series connected capacitors formed with overlapping elements in adjacent capacitors having decreasing areas of overlap from said feed end, said adjacent capacitors having a maximum capacitance at said feed end and a minimum capacitance at said remote end, whereby said antenna exhibits an essentially constant impedance and pattern shape over a wide frequency range.

2. The quadrifilar helix antenna as recited in claim 1 wherein each of antenna elements extends from said feed end to said remote end of said cylindrical support and said capacitor at said feed end of each said antenna element has the greatest capacitive value.

3. The quadrifilar helix antenna as recited in claim 1 wherein each of antenna elements extends from said feed end to said remote end of said cylindrical support, said capacitors in each said antenna element varying in value from a maximum capacitance at said feed end to a minimum capacitance at said remote end.

4. The quadrifilar helix antenna as recited in claim 3 wherein each of said capacitors includes a dielectric and substantially square overlapping areas of metal layers on opposite sides of said dielectric.

5. The quadrifilar helix antenna as recited in claim 4, wherein:

said dielectric comprises a plurality of helically wrapped dielectric sheets, each of said plurality of dielectric sheets coextensive with one of the antenna elements; and said metal layers comprise a series of spaced rectangular metal segments along each side of each of said plurality of dielectric sheets, said metal segments on opposite sides of each said plurality dielectric sheets being offset with each other along the length thereof, thereby to define the substantially square overlapping areas.

6. The quadrifilar helix antenna as recited in claim 5 wherein the areas of each square overlapping area diminish from a maximum at said feed end to a minimum at said remote end of said antenna element.

7. A quadrifilar helix antenna comprising:

a cylindrical support extending along an antenna axis;

a plurality of dielectric strips wrapped helically about said cylindrical support from a feed end to a remote end; and a plurality of conductive elements spaced along opposite sides of each of said dielectric strips, each said conductive element on one side being offset with respect to a corresponding conductive element on the other side thereby to partially overlap with respect to at least one said conductive element on the other side, each said overlap, together with the dielectric therebetween, forming a capacitive element to define an antenna element formed as a plurality of series connected capacitive elements, said conductive elements having different sizes and said series of capacitive elements having a maximum capacitance at said feed end and a minimum capacitance at said remote end whereby the capacitive elements exhibit a maximum capacitance at said feed end, whereby said antenna exhibits an essentially constant input impedance and pattern over a wide frequency range.

8. The quadrifilar helix antenna as recited in claim 7 wherein:

each said strip has a substantially constant thickness and width; and said conductive elements have a substantially constant thickness and have widths that vary from a maximum at said feed end to a minimum at said remote end.

9. The quadrifilar helix antenna as recited in claim 8 wherein said conductive elements in each said antenna element are arranged so that areas of overlap between opposed conductive elements form capacitors having a substantially square electrodes of decreasing areas from said feed end to said remote end.

10. The quadrifilar helix antenna as recited in claim 8 wherein said capacitors in each said antenna element are formed as linked, square capacitors having areas that decrease from said feed end to said remote end.

11. The quadrifilar helix antenna as recited in claim 10 wherein the area of each said square is given by:

$$A_{sc} = 2\left(\frac{A_{cc} * t_{sh}}{t_n}\right)F^2 \frac{n_c}{39}$$

where $A_{sc}$, is the area of a square capacitor, $A_{cc}$ is the area of a cylindrical capacitor, $t_{sh}$ is the thickness of the dielectric, F is a size-scaling factor, $n_c$ is the total number of capacitors on one of said antenna elements, and $t_n$ is the thickness of the cylindrical capacitor obtained from the relationship $t_n=A(e^{\alpha n}-1)$, where A is a constant=12.5, α is a rate of exponentiation=0.8, and n is the number of the capacitor for which the area $A_{sc}$, is being determined.

12. The quadrifilar helix antenna as recited in claim 11 wherein said dielectric strip is Mylar.

13. The quadrifilar helix antenna as recited in claim 12 wherein said conductive elements are copper.

* * * * *

UNITED STATES PATENT AND TRADEMARK OFFICE

CERTIFICATE OF CORRECTION

PATENT NO. : 6,407,720 B1 Page 1 of 1
APPLICATION NO. : 09/602517
DATED : June 18, 2002
INVENTOR(S) : Michael J. Josypenko It is certified that error appears in the above-identified patent and that said Letters Patent is hereby corrected as shown below:

Col. 1, line 7, replace “09/356,808” with -- 09/356,803--

Signed and Sealed this

Eighth Day of August, 2006

JON W. DUDAS

*Director of the United States Patent and Trademark Office*